(12) United States Patent  
Hall

(10) Patent No.: US 9,398,125 B1  
(45) Date of Patent: Jul. 19, 2016

(54) MOBILE DEVICE WITH AN EXPANDABLE DISPLAY SCREEN

(71) Applicant: Carissa Hall, Chicago, IL (US)

(72) Inventor: Carissa Hall, Chicago, IL (US)

( * ) Notice: Subject to any disclaimer, the term of this patent is extended or adjusted under 35 U.S.C. 154(b) by 0 days.

(21) Appl. No.: 14/836,002

(22) Filed: Aug. 26, 2015

(51) Int. Cl.
*H04M 1/02* (2006.01)
*G06F 1/16* (2006.01)

(52) U.S. Cl.
CPC ........... *H04M 1/0266* (2013.01); *G06F 1/1652* (2013.01); *H04M 1/0206* (2013.01)

(58) Field of Classification Search
CPC ............................ G06F 1/1652; H04M 1/0206
USPC ............................ 455/566, 575.1, 550.1, 90.3
See application file for complete search history.

(56) References Cited

U.S. PATENT DOCUMENTS

| | | | |
|---|---|---|---|
| 6,931,265 B2 * | 8/2005 | Reyes ................. | H04M 1/0247 345/1.1 |
| 8,711,566 B2 * | 4/2014 | O'Brien ................. | G06F 1/1624 361/724 |
| 8,851,372 B2 | 10/2014 | Zhou et al. | |
| 2007/0293273 A1 * | 12/2007 | Rochford ................. | H04M 1/23 455/566 |
| 2008/0318633 A1 * | 12/2008 | Wong .................. | H04M 1/0216 455/566 |
| 2015/0089429 A1 * | 3/2015 | Ghassabian ......... | G06F 3/04886 715/773 |

\* cited by examiner

*Primary Examiner* — John J Lee

(74) *Attorney, Agent, or Firm* — Crossley & Stevenson Intellectual Property Law

(57) ABSTRACT

A mobile device with an expandable display screen including a first housing and a second housing. The first housing has a left side, a right side, a front side, a back side, a top side, a bottom side, a first display screen, a first camera, a rechargeable battery, a speaker, a microphone, and a plurality of controls. The left side of the first housing has a rearwardly extending L-shaped first tab, and the right side of the first housing has a rightwardly extending L-shaped second tab. A second housing having a second display screen is slidably attached to the first housing. A left area of the second housing has a leftwardly extending L-shaped third tab, and the right area of the second housing has a frontwardly extending L-shaped fourth tab. The second housing has an extended position and an alternate retracted position.

4 Claims, 3 Drawing Sheets

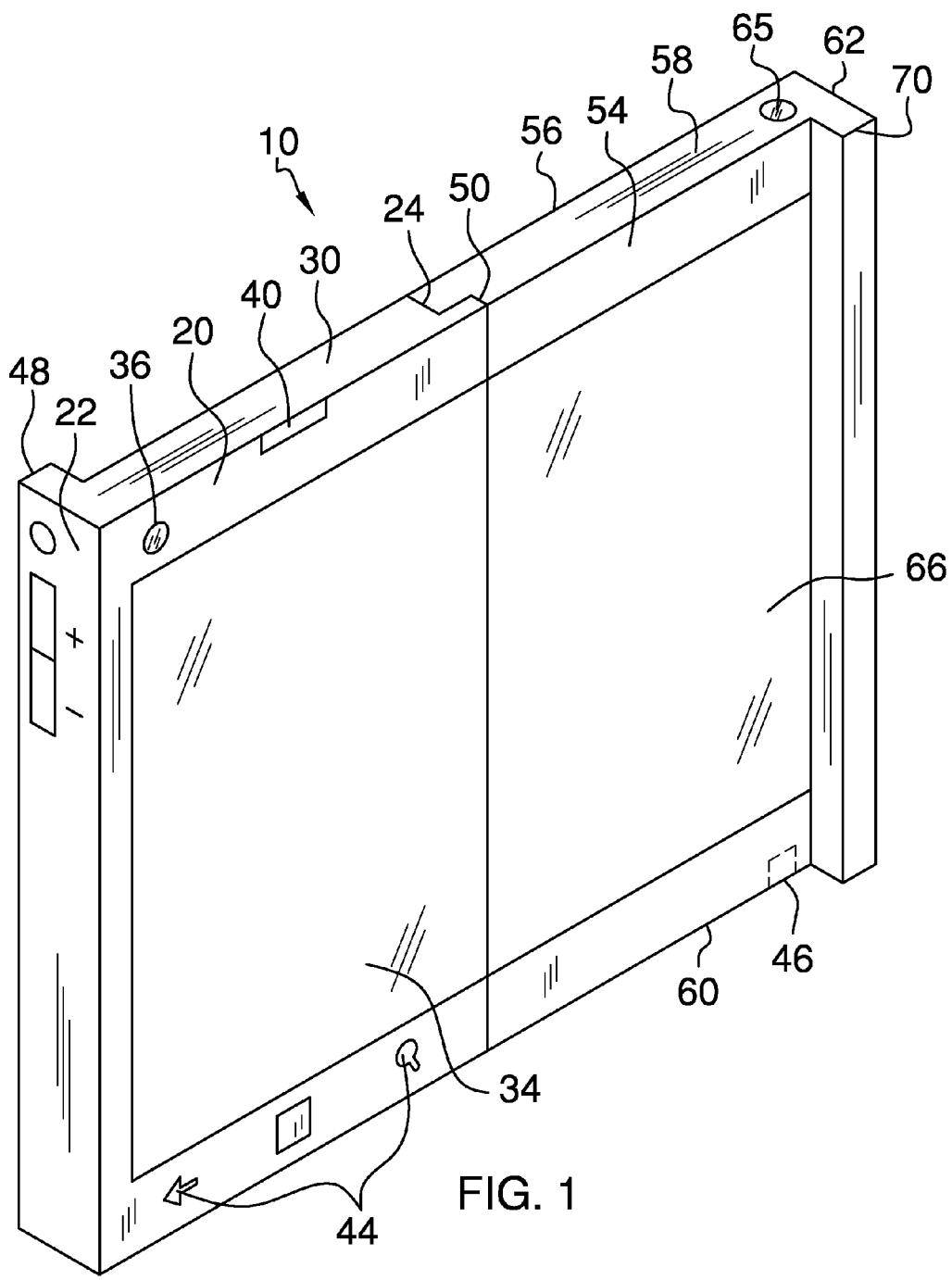

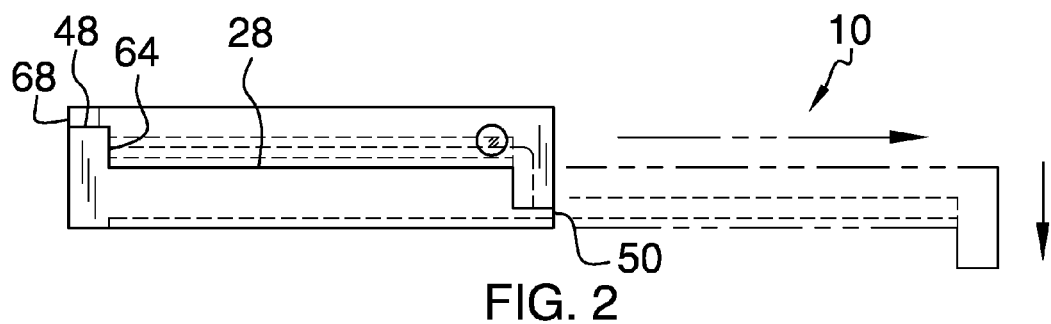
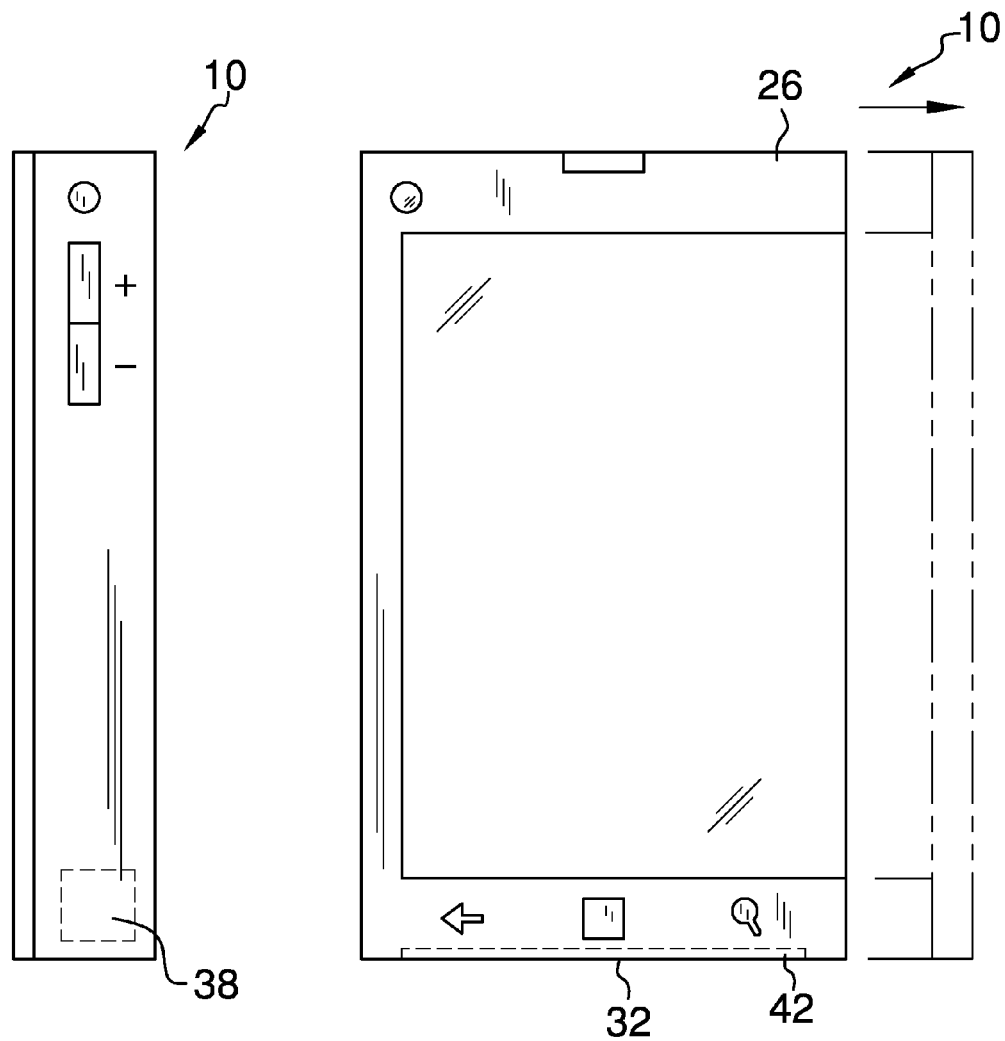

MOBILE DEVICE WITH AN EXPANDABLE DISPLAY SCREEN

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of mobile devices are known in the prior art. However, what has been needed is a mobile device with an expandable display screen including a first housing having a first display screen, a first camera, a rechargeable battery, a speaker, a microphone, a plurality of controls, a rearwardly extending L-shaped first tab, and a rightwardly extending L-shaped second tab. What has been further needed is a second housing slidably attached to the first housing, with the second housing having a second display screen, an audio port, a second camera, a charging port, a leftwardly extending L-shaped third tab, and a frontwardly extending L-shaped fourth tab. Lastly, what has been needed is for the second housing to have an extended position and an alternate retracted position. The second housing is in the extended position when the first housing is collinearly disposed adjacent to the second housing. The second housing is in the retracted position when the second housing is disposed directly behind and parallel to the first housing. The second tab is selectively lockable adjacent to the third tab when the second housing is in the extended position, and the third tab and the fourth tab are selectively lockable adjacent to the first tab and the second tab, respectively, when the second housing is in the retracted position. The mobile device with an expandable display screen, which is optionally shatterproof and waterproof, thus provides a user of the device with the option to temporarily double the size of a display screen while retaining the features and capabilities of the mobile device.

FIELD OF THE INVENTION

The present invention relates to mobile devices, and more particularly, to a mobile device with an expandable display screen.

SUMMARY OF THE INVENTION

The general purpose of the present mobile device with an expandable display screen, described subsequently in greater detail, is to provide a mobile device which has many novel features that result in mobile device with an expandable display screen which is not anticipated, rendered obvious, suggested, or even implied by prior art, either alone or in combination thereof.

To accomplish this, the present mobile device with an expandable display screen includes a first housing having a left side, a right side, a front side, a back side, a top side, a bottom side, a first display screen disposed on the front side, a first camera having a flash, a rechargeable battery, a speaker, a microphone, and a plurality of controls. The left side of the first housing has a rearwardly extending L-shaped first tab continuously disposed on the left side of the first housing from the top side of the first housing to the bottom side of the first housing. The first tab is perpendicularly disposed with the top side of the first housing. A length of the first tab and a width of the first tab is optionally 5 inches and 3 inches, respectively. The right side of the first housing has a rightwardly extending L-shaped second tab continuously disposed from the front side of the first housing to substantially one half of a length of the right side of the first housing and from the top side of the first housing to the bottom side of the first housing. The second tab is perpendicularly disposed with the right side of the first housing. A length of the second tab and a width of the second tab is optionally 5 inches and 3 inches, respectively.

A second housing is slidably attached to the first housing. The second housing has a front area, a back area, a top area, a bottom area, a right area, a left area, an audio port, a charging port, a second camera having a flash, and a second display screen disposed on the front area. A height of the first housing is equal to a height of the second housing, a length of the first housing is equal to a length of the second housing, and a width of the first housing is equal to a width of the second housing. The left area of the second housing has a leftwardly extending L-shaped third tab continuously disposed from the back area of the second housing to substantially one half of a length of the left area of the second housing and from the top area of the second housing to the bottom area of the second housing. The third tab is perpendicularly disposed with the left area of the second housing. The right area of the second housing has a frontwardly extending L-shaped fourth tab continuously disposed on the right area of the second housing from the top area of the second housing to the bottom area of the second housing. A length of the first tab and a width of the first tab is equal to a length of the fourth tab and a width of the fourth tab, respectively. A length of the second tab and a width of the second tab is equal to a length of the third tab and a width of the third tab, respectively.

The second housing has an extended position and an alternate retracted position. The second housing is in the extended position when the first housing is collinearly disposed adjacent to the second housing. The second housing is in the retracted position when the second housing is disposed directly behind and parallel to the first housing. The second tab is selectively lockable adjacent to the third tab when the second housing is in the extended position. The third tab is selectively lockable adjacent to the first tab, and the fourth tab is selectively lockable adjacent to the second tab when the second housing is in the retracted position.

The mobile device with an expandable display screen optionally includes a plurality of a pair of tracks including a first pair of tracks and a second pair of tracks. Each of the first pair of tracks and the second pair of tracks has a top track and a bottom track. The top track of each of the first pair of tracks and the second pair of tracks is horizontally disposed on the back side of the first housing proximal the top side and the front area of the second housing proximal the top area, respectively. The bottom track of each of the first pair of tracks and the second pair of tracks is horizontally disposed on the back side of the first housing proximal the bottom side and the front area of the second housing proximal the bottom area, respectively. The top track of the first pair of tracks is collinearly disposed with the top track of the second pair of tracks. The bottom track of the first pair of tracks is collinearly disposed with the bottom track of the second pair of tracks.

Each of the top track of the first pair of tracks and the bottom track of the first pair of tracks is configured to slidably engage each of the top track of the second pair of tracks and the bottom track of the second pair of tracks, respectively, when the second housing alternates between the extended position and the retracted position.

Thus has been broadly outlined the more important features of the present mobile device with an expandable display screen so that the detailed description thereof that follows may be better understood and in order that the present contribution to the art may be better appreciated.

BRIEF DESCRIPTION OF THE DRAWINGS

Figures

FIG. 1 is a front isometric view.
FIG. 2 is a top plan view.
FIG. 3 is a side elevation view.
FIG. 4 is a front elevation view.

DETAILED DESCRIPTION OF THE DRAWINGS

Figure 5:
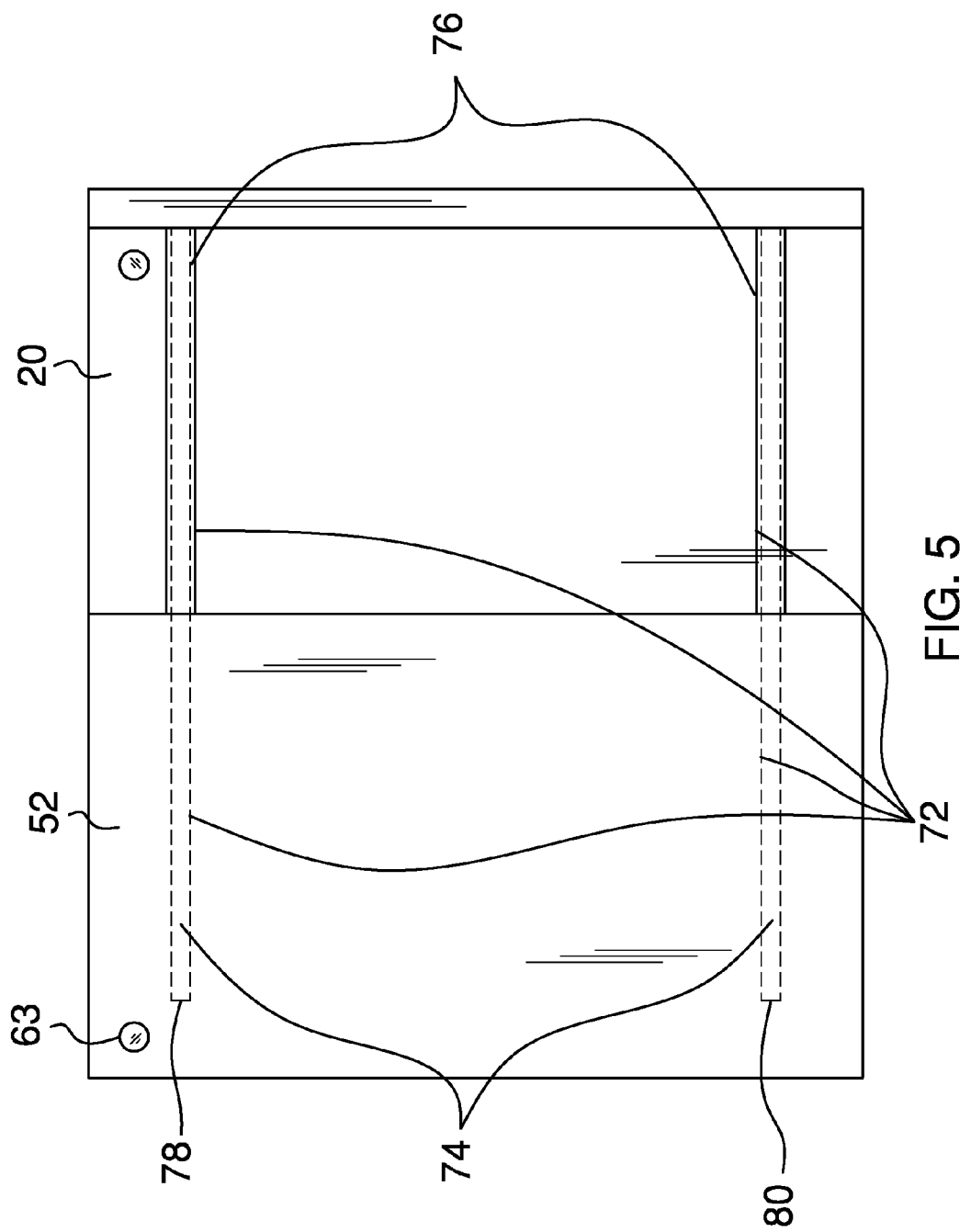
FIG. 5 is a rear elevation view.

With reference now to the drawings, and in particular FIGS. 1 through 5 thereof, an example of the instant mobile device with an expandable display screen employing the principles and concepts of the present mobile device with an expandable display screen and generally designated by the reference number 10 will be described.

Referring to FIGS. 1 through 5 the present mobile device with an expandable display screen 10 is illustrated. The mobile device with an expandable display screen 10 includes a first housing 20 having a left side 22, a right side 24, a front side 26, a back side 28, a top side 30, a bottom side 32, a first display screen 34 disposed on the front side 26, a first camera 36, a rechargeable battery 38, a speaker 40, a microphone 42, and a plurality of controls 44. The left side 22 of the first housing 20 has a rearwardly extending L-shaped first tab 48 continuously disposed on the left side 22 of the first housing 20 from the top side 30 of the first housing 20 to the bottom side 32 of the first housing 20. The first tab 48 is perpendicularly disposed with the top side 30 of the first housing 20. The right side 24 of the first housing 20 has a rightwardly extending L-shaped second tab 50 continuously disposed from the front side 26 of the first housing 20 to substantially one half of a length of the right side 24 of the first housing 20 and from the top side 30 of the first housing 20 to the bottom side 32 of the first housing 20. The second tab 50 is perpendicularly disposed with the right side 24 of the first housing 20.

A second housing 52 is slidably attached to the first housing 20. The second housing 52 has a front area 54, a back area 56, a top area 58, a bottom area 60, a right area 62, a left area 64, a second camera 63, an audio port 65, a charging port 46, and a second display screen 66 disposed on the front area 54. The left area 64 of the second housing 52 has a leftwardly extending L-shaped third tab 68 continuously disposed from the back area 56 of the second housing 52 to substantially one half of a length of the left area 64 of the second housing 52 and from the top area 58 of the second housing 52 to the bottom area 60 of the second housing 52. The third tab 68 is perpendicularly disposed with the left area 64 of the second housing 52. The right area 62 of the second housing 52 has a frontwardly extending L-shaped fourth tab 70 continuously disposed on the right area 62 of the second housing 52 from the top area 58 of the second housing 52 to the bottom area 60 of the second housing 52.

The second housing 52 has an extended position and an alternate retracted position. The second housing 52 is in the extended position when the first housing 20 is collinearly disposed adjacent to the second housing 52. The second housing 52 is in the retracted position when the second housing 52 is disposed directly behind and parallel to the first housing 20. The second tab 50 is selectively lockable adjacent to the third tab 68 when the second housing 52 is in the extended position. The third tab 68 is selectively lockable adjacent to the first tab 48, and the fourth tab 70 is selectively lockable adjacent to the second tab 50 when the second housing 52 is in the retracted position.

As best shown in FIG. 5, the mobile device with an expandable display screen 10 optionally includes a plurality of a pair of tracks 72 including a first pair of tracks 74 and a second pair of tracks 76. Each of the first pair of tracks 74 and the second pair of tracks 76 has a top track 78 and a bottom track 80. The top track 78 of each of the first pair of tracks 74 and the second pair of tracks 76 is horizontally disposed on the back side 28 of the first housing 20 proximal the top side 30 and the front area 54 of the second housing 52 proximal the top area 58, respectively. The bottom track 80 of each of the first pair of tracks 74 and the second pair of tracks 76 is horizontally disposed on the back side 28 of the first housing 20 proximal the bottom side 32 and the front area 54 of the second housing 52 proximal the bottom area 60, respectively. The top track 78 of the first pair of tracks 74 is collinearly disposed with the top track 78 of the second pair of tracks 76. The bottom track 80 of the first pair of tracks 74 is collinearly disposed with the bottom track 80 of the second pair of tracks 76. Each of the top track 78 of the first pair of tracks 74 and the bottom track 80 of the first pair of tracks 74 is configured to slidably engage each of the top track 78 of the second pair of tracks 76 and the bottom track 80 of the second pair of tracks 76, respectively, when the second housing 52 alternates between the extended position and the retracted position.

What is claimed is:

1. A mobile device with an expandable display screen comprising:
    a first housing having a left side, a right side, a front side, a back side, a top side, a bottom side, a first display screen disposed on the front side, a first camera, a rechargeable battery, a speaker, a microphone, and a plurality of controls;
    wherein the first housing left side has a rearwardly extending L-shaped first tab continuously disposed on the first housing left side from the first housing top side to the first housing bottom side;
    wherein the L-shaped first tab is perpendicularly disposed with the first housing top side;
    wherein the first housing right side has a rightwardly extending L-shaped second tab continuously disposed from the first housing front side to substantially one half of a length of the first housing right side and from the first housing top side to the first housing bottom side;
    wherein the L-shaped second tab is perpendicularly disposed with the first housing right side; and
    a second housing slidably attached to the first housing, the second housing having a front area, a back area, a top area, a bottom area, a right area, a left area, a second camera, an audio port, a charging port, and a second display screen disposed on the front area;
    wherein a height of the first housing is equal to a height of the second housing;
    wherein a length of the first housing is equal to a length of the second housing;

wherein a width of the first housing is equal to a width of the second housing;

wherein the second housing left area has a leftwardly extending L-shaped third tab continuously disposed from the second housing back area to substantially one half of a length of the second housing left area and from the second housing top area to the second housing bottom area;

wherein the L-shaped third tab is perpendicularly disposed with the second housing left area;

wherein the second housing right area has a frontwardly extending L-shaped fourth tab continuously disposed on the second housing right area from the second housing top area to the second housing bottom area;

wherein a length of the first tab and a width of the first tab is equal to a length of the L-shaped fourth tab and a width of the fourth tab, respectively;

wherein a length of the second tab and a width of the second tab is equal to a length of the third tab and a width of the third tab, respectively;

wherein the second housing has an extended position and an alternate retracted position;

wherein the second housing is in the extended position when the first housing is collinearly disposed adjacent to the second housing, wherein the second housing is in the alternate retracted position when the second housing is disposed directly behind and parallel to the first housing;

wherein the second tab is selectively lockable adjacent to the third tab when the second housing is in the extended position;

wherein the third tab is selectively lockable adjacent to the first tab, and the fourth tab is selectively lockable adjacent to the second tab when the second housing is in the retracted position.

2. The mobile device with an expandable display screen of claim 1 further comprising:

a plurality of a pair of tracks comprising a first pair of tracks and a second pair of tracks, each of the first pair of tracks and the second pair of tracks having a top track and a bottom track, wherein the top track of each of the first pair of tracks and the second pair of tracks is horizontally disposed on the first housing back side proximal the top side and the second housing front area proximal the top area, respectively, wherein the bottom track of each of the first pair of tracks and the second pair of tracks is horizontally disposed on the first housing back side proximal the bottom side and the second housing front area proximal the bottom area, respectively;

wherein the top track of the first pair of tracks is collinearly disposed with the top track of the second pair of tracks;

wherein the bottom track of the first pair of tracks is collinearly disposed with the bottom track of the second pair of tracks;

wherein each of the top track of the first pair of tracks and the bottom track of the first pair of tracks is configured to slidably engage each of the top track of the second pair of tracks and the bottom track of the second pair of tracks, respectively, when the second housing alternates between the extended position and the retracted position.

3. The mobile device with an expandable display screen of claim 2 wherein a length of the first tab and a width of the first tab is 5 inches and 3 inches, respectively.

4. The mobile device with an expandable display screen of claim 3 wherein a length of the second tab and a width of the second tab is 5 inches and 3 inches, respectively.

* * * * *